(12) United States Patent
Heyn (10) Patent No.: US 11,858,054 B2
(45) Date of Patent: Jan. 2, 2024

(54) GEARING METHOD WITH TOOTH FINISHING AND COMBINATION TOOL THEREFOR

(71) Applicant: Profilator GmbH & Co. KG, Wuppertal (DE)

(72) Inventor: Stefan Heyn, Sprockhövel (DE)

(73) Assignee: Profilator GmbH & Co. KG, Wuppertal (DE)

(*) Notice: Subject to any disclaimer, the term of this patent is extended or adjusted under 35 U.S.C. 154(b) by 0 days.

(21) Appl. No.: 16/942,826

(22) Filed: Jul. 30, 2020

(65) Prior Publication Data
US 2020/0353547 A1 Nov. 12, 2020

Related U.S. Application Data

(62) Division of application No. 15/560,062, filed as application No. PCT/EP2016/054437 on Mar. 2, 2016, now Pat. No. 10,773,322.

(30) Foreign Application Priority Data

Mar. 20, 2015 (DE) .......................... 102015104242.8

(51) Int. Cl.
*B23F 21/14* (2006.01)
*B23F 21/20* (2006.01)
(Continued)

(52) U.S. Cl.
CPC ............ *B23F 5/163* (2013.01); *B23F 17/006* (2013.01); *B23F 19/107* (2013.01);
(Continued)

(58) Field of Classification Search
CPC . Y10T 409/105565; Y10T 409/105406; Y10T 409/108904; Y10T 409/108586;
(Continued)

(56) References Cited

U.S. PATENT DOCUMENTS

| 2,214,225 A | 9/1940 | Drummond |
| 2,678,487 A * | 5/1954 | Onsrud ..................... B23C 5/22 407/42 |

(Continued)

FOREIGN PATENT DOCUMENTS

| DE | 2654177 A1 | 6/1978 |
| DE | 19918289 A | 10/2000 |

(Continued)

OTHER PUBLICATIONS

Translation of JP 2016-010847-A, which JP '847 was published Jan. 2016.*

(Continued)

*Primary Examiner* — Erica E Cadugan
(74) *Attorney, Agent, or Firm* — Whitmyer IP Group LLC (57) ABSTRACT

A method for producing gears, wherein in a first step a set of teeth is formed by means of a skiving wheel rotationally driven by a tool spindle in a workpiece gear rotationally driven synchronously thereto by a workpiece spindle, wherein the workpiece spindle and the tool spindle are at an axis intersection angle to each other and the advancement occurs in the tooth-flank extension direction, and wherein in a second step at least some teeth of the set of teeth are machined by means of a tooth-machining tool. A combined tool is used, in the case of which the toothmachining tool and the skiving wheel are fixedly connected to each other. Between the two steps, the combined tool remains connected to the tool spindle and the workpiece gear remains connected to the workpiece spindle. Between the two steps, merely the relative position of the tool spindle in relation to the workpiece spindle and the rotational speed ratio of the two spindles are changed.

11 Claims, 6 Drawing Sheets

(51) Int. Cl.
  B23F 19/10 (2006.01)
  B23F 5/16 (2006.01)
  B23F 21/00 (2006.01)
  B23F 23/12 (2006.01)
  B23F 17/00 (2006.01)
  B23P 13/02 (2006.01)
  B23P 15/14 (2006.01)

(52) U.S. Cl.
  CPC ........ B23F 21/005 (2013.01); B23F 23/1237 (2013.01); B23P 13/02 (2013.01); B23P 15/14 (2013.01); *Y10T 29/5168* (2015.01); *Y10T 29/5176* (2015.01); *Y10T 409/10795* (2015.01); *Y10T 409/101272* (2015.01); *Y10T 409/105565* (2015.01); *Y10T 409/108586* (2015.01)

(58) Field of Classification Search
  CPC ... Y10T 409/108427; Y10T 409/10795; Y10T 29/5168; B23F 21/005; B23F 17/006; B23F 21/20; B23F 21/203; B23F 21/206; B23F 21/128; B23F 21/14; B23F 21/143; B23F 21/146; B23F 21/126; B23F 21/122; B23F 21/106; B23F 21/103
  USPC ........ 409/36, 35, 57, 55, 54, 51; 29/56.5, 50
  See application file for complete search history.

(56) References Cited

U.S. PATENT DOCUMENTS

| | | | | |
|---|---|---|---|---|
| 2,688,792 | A * | 9/1954 | Sunnen ................ | B23C 5/2265 407/45 |
| 3,931,754 | A | 1/1976 | Nishijima et al. | |
| 4,720,220 | A * | 1/1988 | Bloch ................... | B23F 21/128 409/47 |
| 4,726,720 | A | 2/1988 | Lieser | |
| 5,655,860 | A * | 8/1997 | Oles ...................... | B23C 5/2265 407/34 |
| 5,704,735 | A * | 1/1998 | Moreau .................. | B23C 5/165 407/53 |
| 8,523,634 | B2 | 9/2013 | Woelfel | |
| 8,596,939 | B2 * | 12/2013 | Prock .................... | B23F 19/102 409/51 |
| 8,732,937 | B2 | 5/2014 | Prock et al. | |
| 10,773,322 | B2 * | 9/2020 | Heyn ..................... | B23F 5/163 |
| 2006/0174464 | A1 | 8/2006 | Fitzgerald et al. | |
| 2009/0142153 | A1 | 6/2009 | Prock et al. | |
| 2015/0011142 | A1 * | 1/2015 | Breith .................. | B24B 53/075 451/56 |
| 2017/0072485 | A1 | 3/2017 | Weppelmann et al. | |
| 2018/0111209 | A1 | 4/2018 | Prock | |
| 2018/0345393 | A1 | 12/2018 | Weixler | |
| 2020/0171591 | A1 * | 6/2020 | Weppelmann .......... | B23F 15/00 |

FOREIGN PATENT DOCUMENTS

| | | | |
|---|---|---|---|
| DE | 10305752 | A1 | 10/2004 |
| DE | 19964396 | B4 | 10/2009 |
| DE | 102008037514 | A1 | 5/2010 |
| DE | 102014008475 | A1 * | 12/2015 |
| EP | 3272448 | A | 1/2018 |
| JP | 2016-010847 | A * | 1/2016 |
| WO | 2015185186 | A1 | 12/2015 |
| WO | WO-2020/216657 | A1 * | 10/2020 |

OTHER PUBLICATIONS

"Abdachen und Verzahnen in einer Aufspannung Herstellung von Zahnradern und verzahnten Bauteilen" Carl Hanser Verlag, Munchen, Germany, pp. 56-57, published Nov. 1, 2013 2 Pages.

"Frasen und Entgraten in einem Arbeitsgang. Chamfer-Cut Cutting and Deburring in One Process. Chamber Cut" Published: Jan. 1, 2014; pp. 1-6. URL:http://frezyslimakowe.pl/pliki/chamfercut.pdf.

Application DE 102014008475.2, including specification, claims, abstract, and drawings, as filed at the German Patent Office on Jun. 5, 2014.

Article from "Gear Technology", titled "Using Hobs for Skiving; A Pre-Finish and Finishing Solution", by William E. McElroy, pp. 43-45, May/Jun. 1993 edition.

Article from "Gear Technology", titled "Hard Gear Processing with Skiving Hobs", by William E. Loy, pp. 9-14, Mar./Apr. 1985 edition.

International Search Report and Written Opinion Application No. PCT/EP2016/054437 Completed Date: May 18, 2016; dated May 31, 2016 12 Pages.

Listing of file contents (as of Jan. 28, 2020) for German Patent Application No. 102014008475.2 from the German Patent Office Website at https://register.dpma.de/DPMAregister/pat/PatAkteneinsicht?akz=1020140084752, which application was filed Jun. 5, 2014.

Machine Translation of DE 102014008475 A1, which DE '475 was published Dec. 17, 2015.

Machine Translation of DE 10305752A1, which DE '752 was published Oct. 2004.

Machine Translation of DE 19918289 A 1, which DE '289 was published Oct. 2000.

Translation of International Search Report and Written Opinion Application No. PCT/EP2016/054437 Completed Date: May 18, 2016; dated May 31, 2016 3 Pages.

Translation of Written Opinion Application No. PCT/EP2016/054437 Completed: Mar. 2, 2016 9 Pages.

Office Action; U.S. Appl. No. 15/560,062; dated Feb. 14, 2019; 7 Pages.

Office Action; U.S. Appl. No. 15/560,062; dated Jun. 24, 2019; 14 Pages.

Office Action; U.S. Appl. No. 15/560,062; dated Jan. 30, 2020; 21 Pages.

* cited by examiner

GEARING METHOD WITH TOOTH FINISHING AND COMBINATION TOOL THEREFOR

TECHNICAL FIELD

The invention pertains to a method for producing gears, in which a skiving wheel, which is rotationally driven by a tool spindle, produces a gearing in a workpiece gear, which is rotationally driven synchronously with the skiving wheel by a workpiece spindle, in a first step, wherein the workpiece spindle and the tool spindle are aligned at an axial intersection angle to one another and the advance takes place in the direction, in which the tooth flanks extend, and wherein at least a few teeth of the gearing are machined with a tooth machining tool in a second step.

BACKGROUND

DE 10 2008 037 514 A1 describes a method for gearing workpiece gears. The blank can be internally or externally geared with a skiving wheel. For this purpose, the workpiece gear is clamped on a workpiece spindle and the skiving wheel is clamped on a tool spindle. The tool spindle and the workpiece spindle are driven synchronously. The workpiece spindle axis and the tool spindle axis are aligned at an axial intersection angle to one another such that the circumferentially geared skiving wheel carries out a skiving motion, in which the cutting edges of the cutting teeth of the skiving wheel move through the workpiece in the direction, in which the teeth extend, and simultaneously carry out a rolling motion. The advance takes place in the direction, in which the teeth extend, i.e. in the direction of the workpiece spindle axis when a spur gearing is produced.

DE 199 64 396 B4 describes a method for finishing a geared workpiece gear with the aid of a tooth machining tool. The tooth machining tool respectively consists of an undercutting tool or grooving tool, by means of which the tooth flanks of the previously produced teeth can be machined.

U.S. Pat. No. 4,726,720 likewise describes a finishing method, in which geared blanks are machined with fly cutters. The fly cutters consist of scarping tools, by means of which the face edges of the teeth can be sloped.

Other methods for machining already geared workpiece gears are also known from the prior art, wherein primarily the tooth flanks or the end faces of the teeth are machined.

In the prior art, the first step, i.e. the gearing of a non-geared blank, is carried out on a first machine tool and the second step, i.e. the tooth finishing, is carried out on a second machine tool. The workpiece has to be reclamped between the machining steps such that clamping errors can occur. Eccentricities and the like particularly occur because the axis of the workpiece gear does not exactly lie coaxial to the axis of the workpiece spindle for tolerance-related reasons. The tools used also have eccentricities, particularly due to tolerances.

The eccentricities of the two tools and of the workpiece clamping fixtures can disadvantageously add up. Production defects are thereby increased.

The invention is based on the objective of disclosing a method, by means of which tolerance-related production defects can be minimized.

SUMMARY

This objective is attained with the invention disclosed in the claims. The dependent claims not only represent advantageous enhancements of the method disclosed in the master claim. The individual dependent claims rather also represent independent inventive concepts.

Initially, it is essentially proposed that the tooth machining tool for the finishing process and the skiving wheel are rigidly connected to one another. The two tools form a combination tool that is carried by the same tool spindle. The machining of the gearwheel, i.e. the gearing and the finishing process, take place in a single clamping position of the workpiece gear. Since neither the workpiece gear nor the tool is removed from the associated spindle between the two machining steps, the aforementioned cumulative eccentricities caused by the reclamping operation no longer occur. In a series production, the position of the tooth machining tool relative to the skiving wheel is always constant. Potentially existing eccentricities can be compensated with the control of the axes of the machine tool. The chuck of the workpiece spindle preferably holds a non-geared or merely pre-geared blank. The gearing of the blank or the final gearing of the blank is then respectively carried out in the first step. The axis of the gearing then preferably lies exactly in the axis of the workpiece spindle. The gearing step is carried out with a skiving tool that features cutting teeth and with an advance in the direction, in which the tooth flanks of the gearing extend, wherein said skiving tool is rotationally driven synchronously with the rotation of the workpiece. In the second step, the geared blank is further processed with the tooth machining tool in the same clamping position on the workpiece spindle. The tooth flanks or the end faces of the teeth are machined in this step. To this end, the tool spindle and the workpiece spindle are also rotationally driven in synchronism. However, the speed ratio preferably differs. Furthermore, the axial intersection angles also differ in the first and in the second step. It is therefore proposed that merely the position of the tool spindle relative to the workpiece spindle and the speed ratio of the two spindles are changed between the two steps. The teeth may be machined by means of scarping, by producing undercuts or grooves or by means of universal milling or boring. Accordingly, the tooth machining tool preferably consists of a scarping tool, an undercutting tool, a grooving tool or a universal milling or boring tool. The tooth machining tool is preferably a fly cutting tool that features one or more individual fly cutters with one or more cutting edges. The cutting edges revolve about the rotational axis along a cutting envelope while the cut is produced. The cutting edges therefore consist of revolving cutting edges. The cutting envelope, along which the cutting edge of the fly cutter revolves, may have a smaller radius than the cutting teeth of the skiving wheel. In the combination tool, the skiving wheel and the tooth machining tool are arranged axially behind one another.

The invention furthermore pertains to a combination tool for use in a method of the above-described type. An essential component of this combination tool is a skiving wheel, which is rigidly connected to a tooth machining tool. The tooth machining tool may carry a fly cutter that features a cutting edge. The skiving wheel and the tooth machining tool are arranged axially behind one another, wherein the tooth machining tool is positioned on the free end of the combination tool and the skiving wheel is arranged between the clamping end and the tooth machining tool.

BRIEF DESCRIPTION OF THE DRAWINGS

An exemplary embodiment of the invention is described below with reference to the attached drawings. In these drawings.

DETAILED DESCRIPTION

Figure 4:
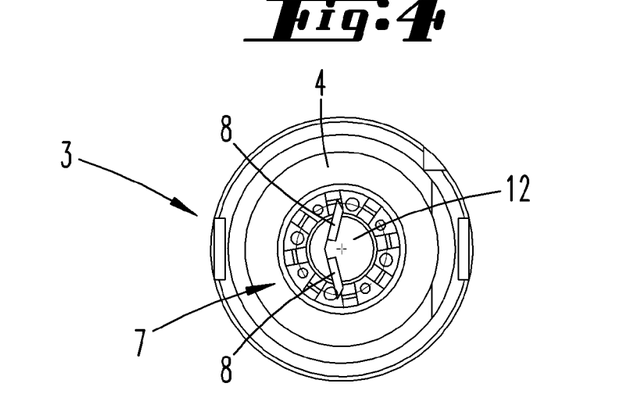
FIG. 4 shows a bottom view of the combination tool 3.
Figure 5:
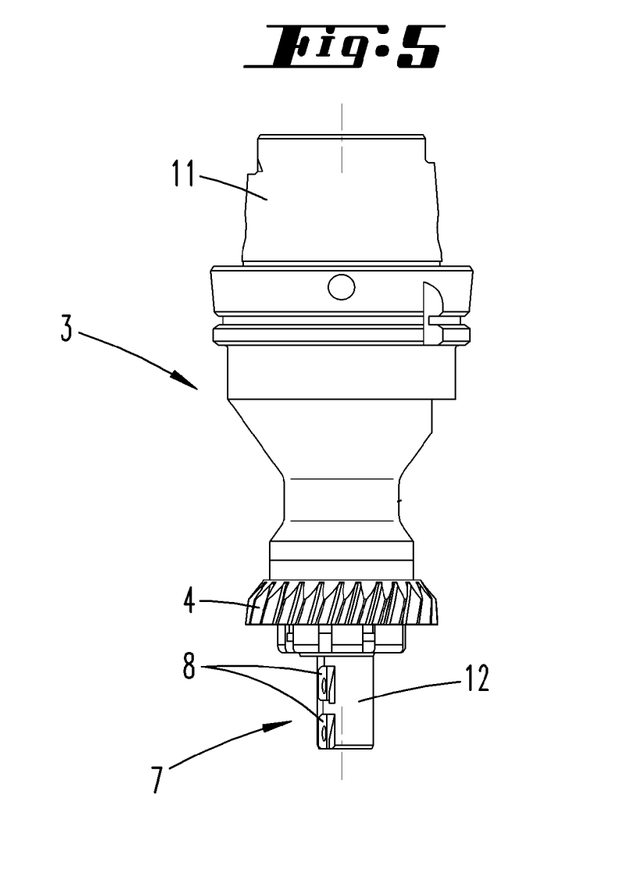
FIG. 5 shows a first side view of the combination tool 3.
Figure 6:
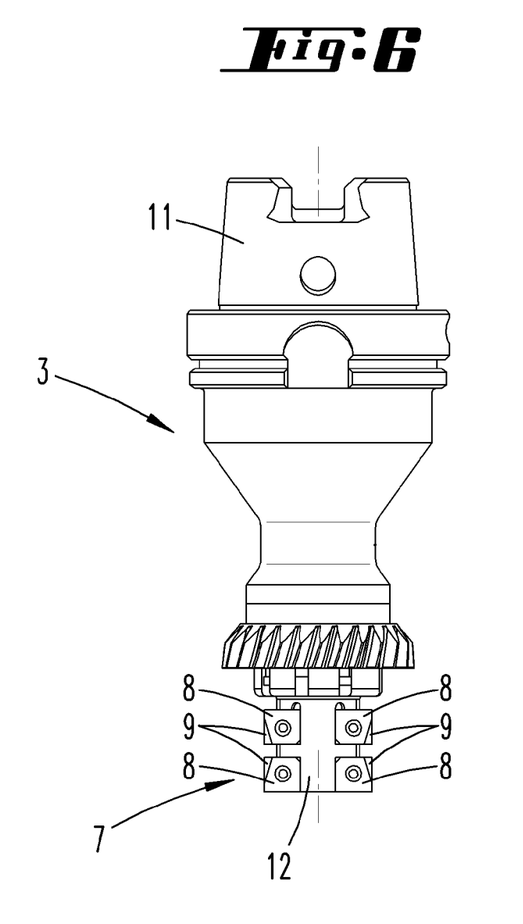
FIG. 6 shows a second side view of the combination tool 3.

The combination tool 3 illustrated in FIGS. 4-6 has a clamping end 11, by means of which the combination tool can be clamped in a chuck of a tool spindle 2, wherein the tool spindle 2 can be rotationally driven by an electric motor. The electric motor is controlled by a control unit. The control unit also controls another electric motor for driving the workpiece spindle 5. The workpiece spindle 5 features a chuck 10, in which a workpiece gear 1 to be machined is clamped. The control unit is designed in such a way that the tool spindle 2 and the workpiece spindle 5 are driven synchronously.

The combination tool 3 features a skiving wheel 4, by means of which the blank in the form of a workpiece gear can be provided with an internal gearing 6 in a skiving process as described in DE 10 2008 037 514 A1. To this end, the tool spindle 2 and the workpiece spindle 5 are driven synchronously in such a way that the cutting teeth of the skiving wheel 4 penetrate into the tooth gaps of the gearing 6 being produced. In this case, the axis of the tool spindle 2 is aligned relative to the axis of the workpiece spindle 5 at an axial intersection angle α.

Figure 1:
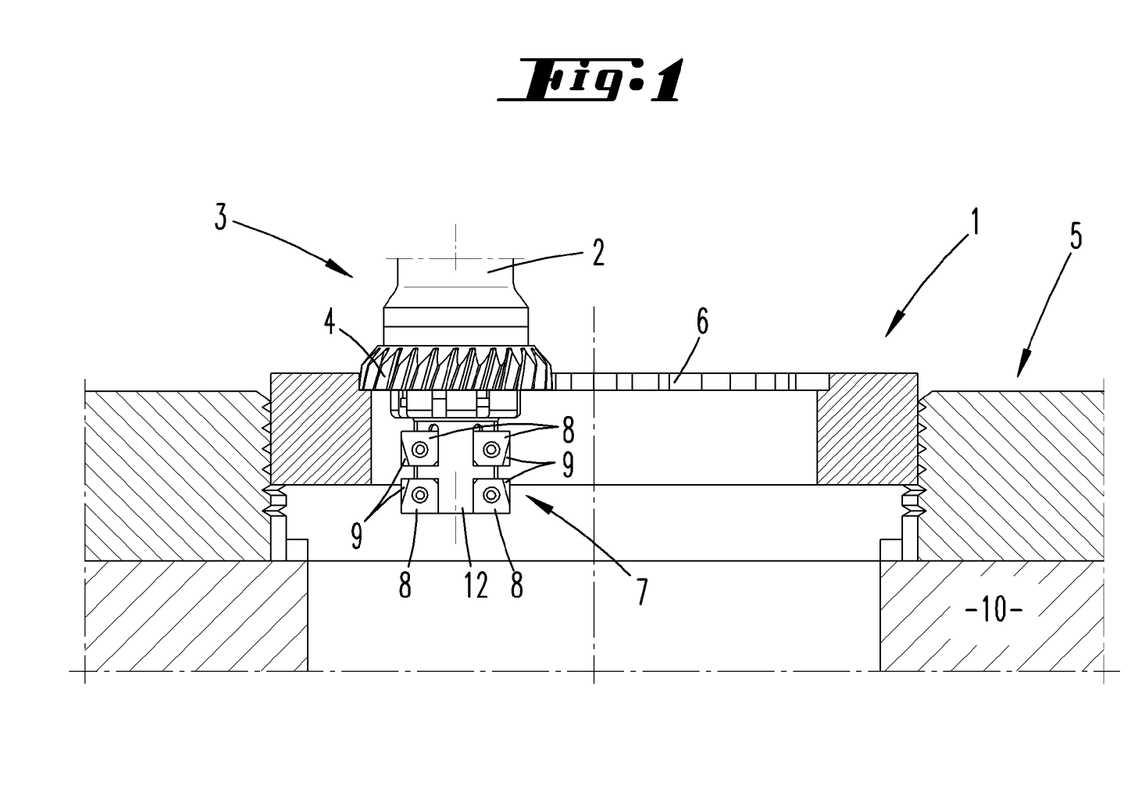
FIG. 1 schematically shows a combination tool 3 during the gearing a workpiece gear 1, which is rigidly connected to a workpiece spindle 5, by means of skiving.
Figure 2:
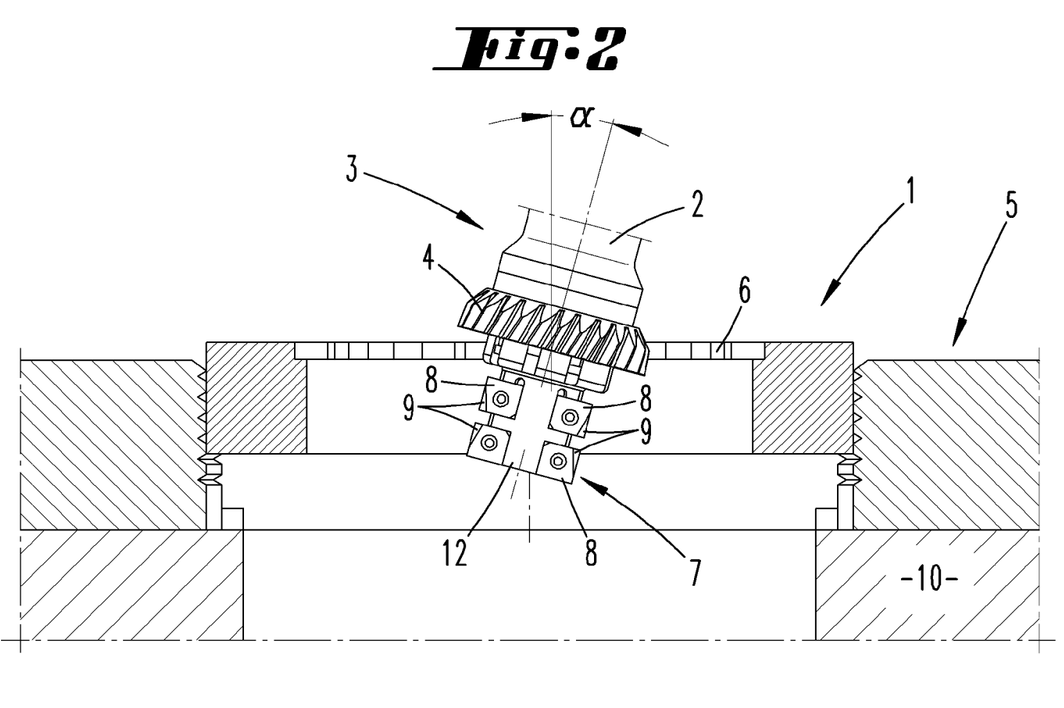
FIG. 2 shows a sectional representation according to FIG. 1 that is offset by 90°—referred to the workpiece spindle 5.

In this context, FIGS. 1 and 2 show a first machining step, in which the advance takes place in the axial direction of the workpiece spindle 5 such that a spur gearing is produced. A relative rotation is superimposed on the advance motion when a helical gearing is produced. Externally geared workpiece gears 1 can also be produced analogously.

The cutting teeth of the skiving wheel 4 point away from the clamping end 11 in the direction toward the free end of the combination tool 3, which is formed by a pin 12. The diameter of the pin 12 is smaller than the diameter of the skiving wheel 4.

The pin 12 is rigidly connected to the skiving wheel 4 and carries multiple fly cutters 8 that respectively feature a cutting edge 9. During a rotation of the combination tool 3 about its rotational axis, the cutting edges 9 revolve about the axis of the combination tool 3 illustrated in the figure along an envelope. The envelope, within which the cutting edges 9 revolve, has a smaller diameter than the cutting teeth of the skiving wheel 4.

Figure 3:
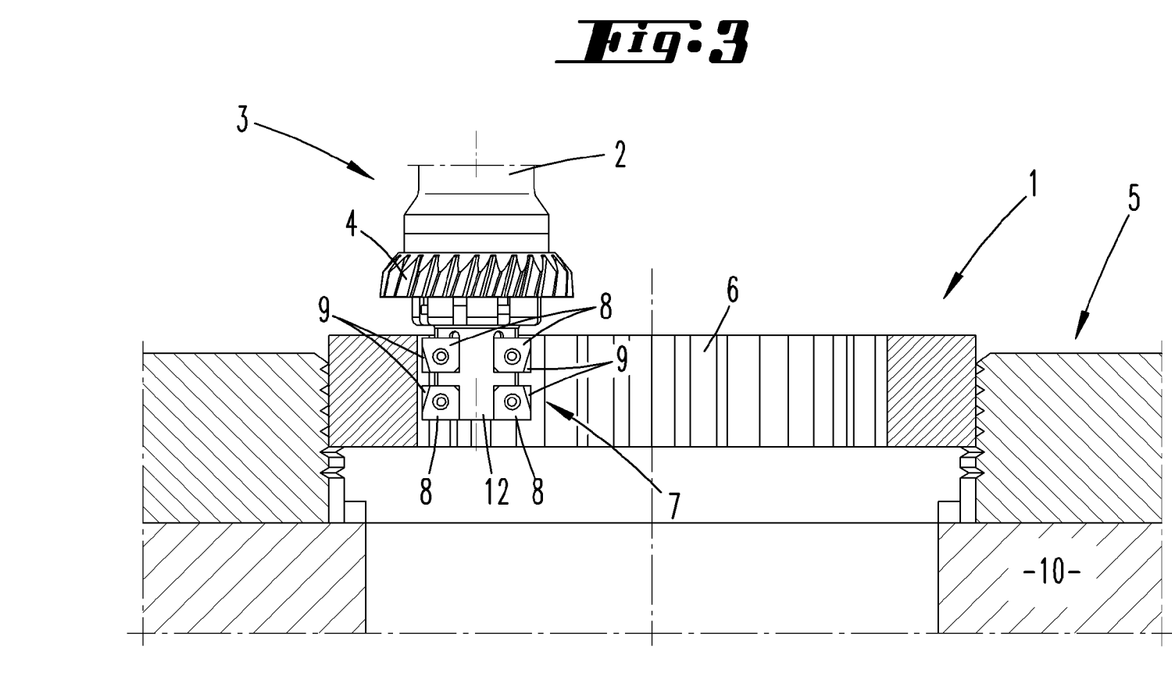
FIG. 3 shows a representation according to FIG. 1 during the tooth finishing process.

In the exemplary embodiment, the tooth machining tool 7 arranged on the free end of the combination tool 3 is a tool for respectively producing grooves or undercuts. To this end, the tooth flank machining tool 7 illustrated in FIG. 3 is moved into a machining position. In this case, the axis of the workpiece spindle 5 extends parallel to the axis of the tool spindle 2. The second machining step illustrated in FIG. 3 is carried out after the first machining step illustrated in FIGS. 1 and 2, but the workpiece gear 1 is in the meantime not removed from the chuck and the combination tool 3 is in the meantime not removed from the tool spindle 2. The combination tool 3 and the workpiece gear 1 remain in their respective clamping positions.

In the machining step illustrated in FIG. 3, the tool spindle 2 and the workpiece spindle 5 are likewise driven synchronously, but with a different speed ratio, such that grooves or undercuts are machined into the tooth flanks of the gearing produced in the first machining step. In this case, the advance takes place in the radial direction of the workpiece spindle 5.

Figure 7:
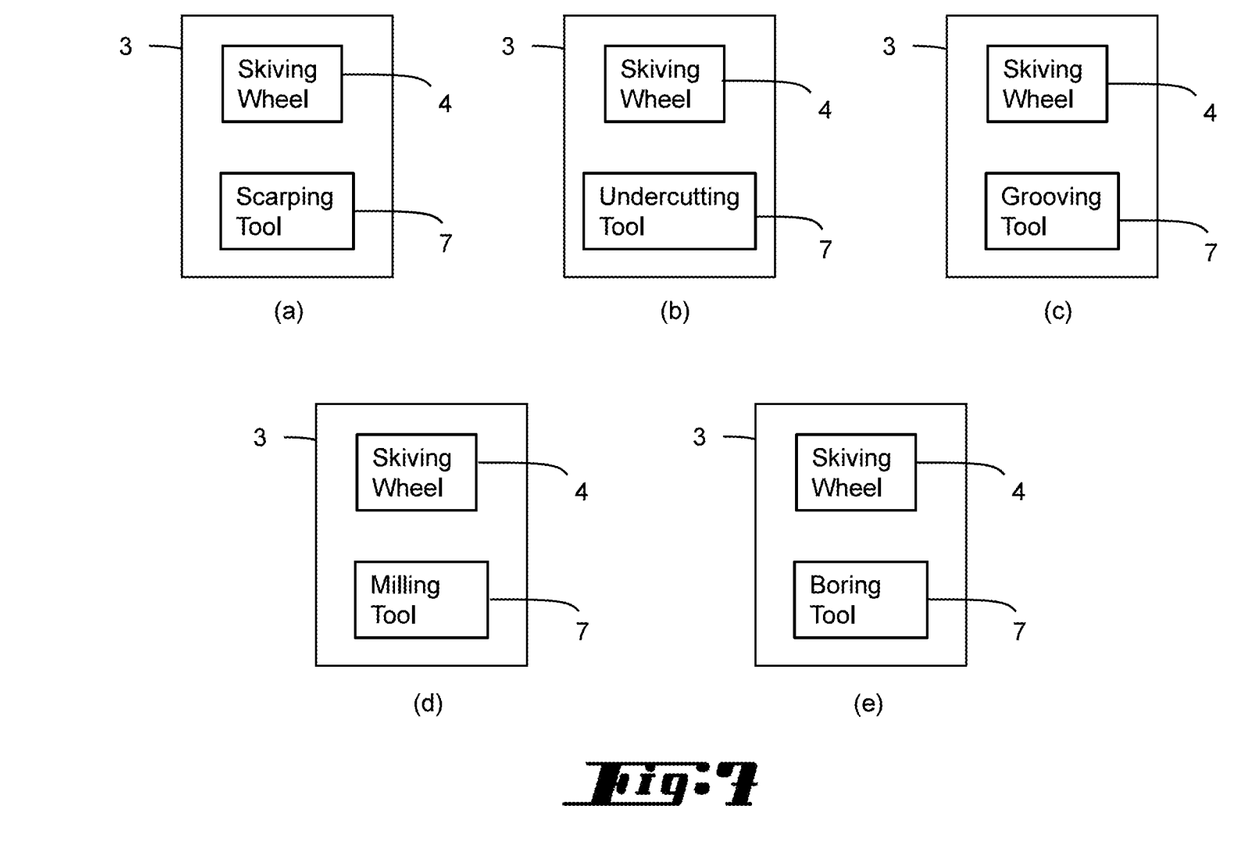
FIG. 7 shows schematically the combination tool 3, wherein a tooth machining tool 7 is a scarping tool, an undercutting tool, a grooving tool, a milling tool, or boring tool.

In an exemplary embodiment that is illustrated in FIG. 7, the tooth flank machining tool may consist of a scarping tool for sloping the end faces of the teeth, which were previously produced in the first step.

The preceding explanations serve for elucidating all inventions that are included in this application and respectively enhance the prior art independently with at least the following combinations of characteristics, namely:

A method, which is characterized in that the tooth machining tool 7 and the skiving wheel 4 are rigidly connected to one another and form a combination tool 3, and in that the combination tool 3 remains connected to the tool spindle 2 and the workpiece gear 1 remains connected to the workpiece spindle 5 between the two steps.

A method, which is characterized in that merely the position of the tool spindle 2 relative to the workpiece spindle 5 and the speed ratio of the two spindles 2, 5 are changed between the two steps.

A method, which is characterized in that the tooth machining tool 7 is a scarping tool, an undercutting tool, a grooving tool or a universal milling or boring tool (FIG. 7).

A method, which is characterized in that the tooth machining tool 7 is a fly cutter with one or more cutting edges, which revolve along a cutting envelope.

A combination tool, which is characterized in that a skiving wheel 4 is rigidly connected to a tooth machining tool 7.

A combination tool, which is characterized in that the tooth machining tool 7 carries a fly cutter 8 with at least one cutting edge 9.

A combination tool, which is characterized in that the skiving wheel 4 is arranged between the tooth machining tool 7 and a clamping end 11 of the combination tool 3.

A combination tool, which is characterized in that the tooth machining tool 7 is assigned to the free end of the combination tool 3, which lies opposite of the clamping end 11.

All disclosed characteristics are essential to the invention (individually, but also in combination with one another). The disclosure content of the associated/attached priority documents (copy of the priority application) is hereby fully incorporated into the disclosure of this application, namely also for the purpose of integrating characteristics of these documents into claims of the present application. The characteristic features of the dependent claims characterize independent inventive enhancements of the prior art, particularly in order to submit divisional applications on the basis of these claims.

What is claimed is:

1. A combination tool attachable to a tool spindle, which combination tool is for use in a method for producing gears, the combination tool having:
    a skiving wheel with a first axis, the skiving wheel being configured to rotate around said first axis and be advanced in a direction in which tooth flanks of a workpiece gear extend to produce a gearing in said workpiece gear, wherein rotation of the skiving wheel about the first axis is synchronous with rotation of the workpiece gear around a second axis, a pin rigidly connected to the skiving wheel, and a tooth machining tool arranged on said pin, the tooth machining tool being a different type of tool from the skiving wheel, the tooth machining tool having multiple fly cutters each with a respective single cutting edge, wherein said fly cutters are all disposed along one side of said pin so as to all be on the same side of a longitudinal center axis of the combination tool, and wherein the tooth machining tool and the skiving wheel form the combination tool.

2. The combination tool according to claim 1, wherein the tooth machining tool in relation to the skiving wheel is operated with a different speed ratio between a workpiece spindle and the tool spindle and a different axial intersection angle ($\alpha$) between the workpiece spindle and the tool spindle, wherein the skiving wheel is rotationally driven by the tool spindle and wherein the workpiece gear is rotationally driven by the workpiece spindle.

3. The combination tool according to claim 2, wherein the tooth machining tool is a tooth flank machining tool, wherein each respective single cutting edge of each of the fly cutters produces grooves or undercuts when the tool spindle is parallel to the workpiece spindle, and wherein the skiving wheel produces the gearing when the tool spindle is aligned relative to the workpiece spindle at an axial intersection angle.

4. The combination tool according to claim 3, wherein the skiving wheel is arranged between the tooth machining tool and a clamping end of the combination tool;

wherein the skiving wheel has cutting teeth;

wherein the combination tool has a free end that is formed by the pin, wherein the pin has a smaller diameter than a diameter of the skiving wheel; and wherein the pin carries said fly cutters, wherein the cutting edges of said fly cutters revolve along an envelope during a rotation of the combination tool about the first axis, and wherein the envelope of the cutting edges has a smaller diameter than a diameter of the cutting teeth of the skiving wheel.

5. The combination tool according to claim 3, wherein the tooth machining tool is arranged at a free end of the combination tool.

6. The combination tool according to claim 2, wherein the skiving wheel is arranged between the tooth machining tool and a clamping end of the combination tool.

7. The combination tool according to claim 6, wherein the tooth machining tool is arranged at a free end of the combination tool.

8. The combination tool according to claim 2, wherein the tooth machining tool is arranged at a free end of the combination tool.

9. The combination tool according to claim 1, wherein the tooth machining tool is an undercutting tool.

10. The combination tool according to claim 1, wherein the tooth machining tool is a grooving tool.

11. The combination tool according to claim 1, wherein the tooth machining tool is a milling tool.

* * * * *